DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 23, 1974

921 O.G. 1307

T921,026

PHOTOSENSITIZED POLYMER COMPOSITIONS

Derek Samuel Brackman, Stanmore, England, assignor to Imperial Chemical Industries Limited, London, England

Filed July 9, 1973, Ser. No. 377,191

Continuation of abandoned application Ser. No. 220,461, Jan. 25, 1972. This application July 9, 1973, Ser. No. 377,191

Int. Cl. C08f *27/28*

U.S. Cl. 260—93.7

No Drawing. 12 Pages Specification

A polymeric composition is provided comprising a thermoplastic polymer and a photosensitizing prodegradant, in which the photosensitizing prodegradant is a salt of iron II or III of:

(a) an organic carboxylic acid having 3–30 carbon atoms in the molecule or sulphonic acids; or (b) an inorganic halogen acid, oxyhalogen acid; or (c) an oxyacid of sulphur, boron, phosphorus or silicon; or (d) an acid derived from an oxide of a metal; or (e) cyanic, thiocyanic, nitrous or hyponitrous acids;

or compounds in which the anions of the foregoing salts are partially replaced by hydroxyl, alkoxy or aryloxy groups, or an ionic iron complex derived from one of the foregoing salts or compounds and an electrically-neutral ligand. The preferred polymers are homopolymers of ethylene, propylene, butene-1,4-methyl pentene-1 and styrene and copolymers of these with one another and/or with other α-olefines. The preferred photosensitizing prodegradants are ferric stearate, ferrous chloride tetrahydate, ferrous chloride and ferric carboxylates of 3 to 30 carbon atoms.